United States Patent
Reichenbach-Klinke et al.

(10) Patent No.: US 9,701,890 B2
(45) Date of Patent: Jul. 11, 2017

(54) PROCESS FOR TERTIARY MINERAL OIL PRODUCTION

(71) Applicant: BASF SE, Ludwigshafen (DE)

(72) Inventors: Roland Reichenbach-Klinke, Traunstein (DE); Bjorn Langlotz, Trostberg (DE); Ian Robert Macefield, North Yorkshire (GB); Christian Spindler, Houston, TX (US)

(73) Assignee: BASF SE, Ludwigshafen (DE)

( * ) Notice: Subject to any disclaimer, the term of this patent is extended or adjusted under 35 U.S.C. 154(b) by 369 days.

(21) Appl. No.: 14/078,908

(22) Filed: Nov. 13, 2013

(65) Prior Publication Data

US 2014/0131039 A1 May 15, 2014

Related U.S. Application Data (60) Provisional application No. 61/726,038, filed on Nov. 14, 2012.

(51) Int. Cl.
| | |
|---|---|
| *E21B 43/20* | (2006.01) |
| *E21B 43/25* | (2006.01) |
| *C09K 8/584* | (2006.01) |
| *C09K 8/588* | (2006.01) |

(52) U.S. Cl.
CPC .............. *C09K 8/588* (2013.01); *C09K 8/584* (2013.01)

(58) Field of Classification Search
CPC ........ C09K 8/588; C09K 8/12; C09K 8/5751; C09K 8/584; C09K 8/5753; C08F 8/00; C08F 2/08; C08F 2/24; C08F 220/56; C08F 2/32; C08F 20/56; E21B 43/20; E21B 43/25
See application file for complete search history.

(56) References Cited

U.S. PATENT DOCUMENTS

| | | | |
|---|---|---|---|
| 4,029,622 A | 6/1977 | Keller et al. | |
| 4,052,353 A | 10/1977 | Scanley | |
| 4,528,321 A | 7/1985 | Allen et al. | |
| 6,365,656 B1 | 4/2002 | Green et al. | |

(Continued)

FOREIGN PATENT DOCUMENTS

| | | |
|---|---|---|
| CA | 832 277 A | 1/1970 |
| CA | 2817792 A1 | 5/2012 |

(Continued)

OTHER PUBLICATIONS

Fletcher et al. "Improving Heavy Oil Recovery Using an Enhanced Polymer System" SPE 154045, Apr. 14, 2012; pp. 1-14.*

(Continued)

*Primary Examiner* — Doug Hutton, Jr.
*Assistant Examiner* — Charles Nold
(74) *Attorney, Agent, or Firm* — Drinker Biddle & Reath LLP (57) ABSTRACT

Process for tertiary mineral oil production in which an aqueous injection fluid comprising at least a water soluble polyacrylamide-(co)polymer dissolved in the aqueous fluid is injected into a mineral oil deposit and the aqueous injection fluid is prepared by mixing a liquid dispersion polymer composition comprising particles of polyacrylamide-(co)polymers dispersed in an organic, hydrophobic liquid with an aqueous fluid. Preferably, the process is carried out on an off-shore production site.

17 Claims, 1 Drawing Sheet

(56) References Cited

U.S. PATENT DOCUMENTS

| | | | |
|---|---|---|---|
| 6,392,596 | B1 | 5/2002 | Lin et al. |
| 6,833,406 | B1 | 12/2004 | Green et al. |
| 2005/0239957 | A1 | 10/2005 | Pillsbury et al. |
| 2010/0048430 | A1 | 2/2010 | Funkhouser et al. |
| 2010/0331191 | A1* | 12/2010 | Bevinakatti et al. .......... 504/363 |
| 2012/0125606 | A1 | 5/2012 | Reichenbach-Klinke et al. |
| 2012/0125643 | A1 | 5/2012 | Langlotz et al. |
| 2012/0129734 | A1 | 5/2012 | Reichenbach-Klinke et al. |
| 2012/0132420 | A1 | 5/2012 | Langlotz et al. |
| 2012/0255731 | A1 | 10/2012 | Reichenbach-Klinke et al. |

FOREIGN PATENT DOCUMENTS

| | | | |
|---|---|---|---|
| DE | 2419764 | A1 | 12/1975 |
| EP | 2283915 | A1 | 2/2011 |
| WO | WO-02/44228 | A2 | 6/2002 |
| WO | WO-2012/069477 | A1 | 5/2012 |
| WO | WO-2012061147 | A1 | 5/2012 |
| WO | WO-2014/075964 | A1 | 5/2014 |

OTHER PUBLICATIONS

International Search Report for PCT/EP2013/073130, mailing date Nov. 21, 2013.

Extended European Search Report for EP12192623.2 mailed Apr. 2, 2013.

Delamaide, Eric, et al., "Daqing Oil Field: The Success of Two Pilots Initiates First Extension of Polymer Injection in a Giant Oil Field", SPE/DOE Ninth Symposium on Improved Oil Recovery in Tulsa, OK, (1994), pp. 401-410.

Edinga, K.J., et al., "Cessford Basal Colorado A Reservoir—Caustic Flood Evaluation", Society of Petroleum Engineers of AIME, (1980), pp. 2103-2110.

Koning, E.J.L., et al., "Evaluation of a Pilot Polymer Flood in the Marmul Field, Oman", SPE, (1988), pp. 385-393.

Teeuw, D., et al., "Design of a Pilot Polymer Flood in the Marmul Field, Oman", SPE, (1982), pp. 513-524.

Hamielec, Archie E., et al., "Polymerization Processes, 2. Modeling of Processes and Reactors", Ullmann's Encyclopedia of Industrial Chemistry, vol. 29, (2012), pp. 225-229.

\* cited by examiner

PROCESS FOR TERTIARY MINERAL OIL PRODUCTION

CROSS-REFERENCE TO RELATED APPLICATIONS

This application claims benefit (under 35 USC 119(e)) of U.S. Provisional Application Ser. No. 61/726,038, filed Nov. 14, 2012, which is incorporated herein by reference in its entirety.

BACKGROUND OF THE INVENTION

The present invention relates to a process for tertiary mineral oil production in which an aqueous injection fluid comprising at least a water soluble polyacrylamide-(co) polymer dissolved in the aqueous fluid is injected into a mineral oil deposit and the aqueous injection fluid is prepared by mixing a liquid dispersion polymer composition comprising particles of polyacrylamide-(co)polymers dispersed in an organic, hydrophobic liquid with an aqueous fluid. Preferably, the process is carried out on an off-shore production site.

The techniques of tertiary mineral oil production include what is known as "polymer flooding". Polymer flooding involves injecting an aqueous solution of a water-soluble thickening polymer through the injection boreholes into the mineral oil deposit. As a result of the injection of the polymer solution, the mineral oil, as in the case of water flooding, is forced through the cavities in the formation, proceeding from the injection borehole, in the direction of the production borehole, and the mineral oil is produced through the production borehole. By virtue of the fact that the polymer formulation, however, has an increased viscosity as compared to the viscosity of water, the risk is reduced that the polymer formulation breaks through to the production borehole with no effect, and hence the mineral oil is mobilized much more homogeneously than in the case of use of mobile water. It is thus possible to mobilize additional mineral oil in the formation. Details of polymer flooding and of polymers suitable for this purpose are disclosed, for example, in "*Petroleum, Enhanced Oil Recovery, Kirk-Othmer, Encyclopedia of Chemical Technology, online edition*, John Wiley & Sons, 2010".

For polymer flooding, a multitude of different water-soluble thickening polymers have been proposed, especially high molecular weight polyacrylamide, copolymers of acrylamide and further comonomers, for example vinylsulfonic acid or acrylic acid. Polyacrylamide may be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

For polymer flooding the water-soluble thickening polymers are usually used as dilute aqueous solutions, for example solutions in fresh-water, brine, sea water and/or formation water. Typical concentrations of the polymer may range from 0.05 wt. % to 0.5 wt. %. Besides the polymers the solutions may comprise additional further components such as surfactants or biocides.

The amounts of polymer solution necessary for polymer flooding are high. Even for flooding only a medium size oilfield it may be necessary to inject some thousand $m^3$ of polymer solution per day into the oil bearing formation and usually the process of polymer flooding continues for months or even years. The polymer solution for polymer flooding may be obtained by dissolving dry polymers on-site, thus for a polymer concentration of 0.2 wt. % and an injection rate of 5000 $m^3$ per day it is necessary to dissolve 10 t of polymer powder per day.

Dissolving dry powders of water-soluble high molecular weight polymers such as polyacrylamides or copolymers comprising acrylamide in water is a time-consuming process. The possibilities to accelerate the process of dissolving the polymer by stirring, dispersing or similar techniques are limited because high molecular weight polymers may be damaged by applying high shear forces and therefore, it is necessary to avoid high shear forces. Therefore, usually large dissolution stations are necessary to dissolve the polymers. While large dissolutions stations usually cause no problems technical for land-based oil production the space on off-shore platforms is limited. Therefore, usually it is necessary to abstain from the use of dissolutions stations for dissolving solid polymers on off-shore platforms. In either case, i.e. for land-based or offshore oil production large dissolution stations are expensive and it is interesting for economic reasons to use smaller sized equipment.

Basically, it may be possible to provide the polymers as dilute solution to off-shore platforms, however transporting such large amounts of dilute solutions mentioned above from a manufacturing site for the polymer to an off-shore platform is very expensive and uneconomical for this reason.

Instead of dissolving solid polymers, it is known in the art to use inverse emulsions of polyacrylamide (co)polymers for enhanced oil recovery (EOR) in particular for use on off-shore platforms. Such inverse emulsions typically comprise about 30 wt. % of polymers. For use inverse emulsions are simply diluted with water to the final concentration of the polymer. EP 2 283 915 A1 discloses a method of continuous dissolution of polyacrylamide emulsions for enhanced oil recovery (EOR).

Such inverse emulsions are obtained by polymerizing an aqueous solution of acrylamide and optionally further ethylenically unsaturated water-soluble comonomers emulsified in a hydrophobic oil phase by using oil- and/or water soluble initiators for radical polymerization. Therefore, inverse emulsions comprise polyacrylamide (co)polymers dissolved or swollen in water whereby the aqueous phase is emulsified in a hydrophobic oil phase. US 2005/0239957 A1 discloses an example for the manufacture of inverse emulsions and suggests the use of such inverse emulsions in oil recovery methods. More details about inverse emulsion polymerization are disclosed for example in Hamielec, A. E., Tobita, H., "*Polymerization Processes, 2. Modeling of Processes and Reactors in "Ullmann's Encyclopedia of Industrial Chemistry"; Online Edition*, Vol. 29, page 226 ff., Wiley-VCH Weinheim, 2012.

However, also the use of inverse emulsions of polyacrylamide (co)polymers suffers from some drawbacks. Their long term stability in particular under typical conditions of storage on off-shore platforms is unsatisfactory because the inverse emulsions tend to form gels. Due to its high water content, either low temperature below the freezing point can lead to inhomogeneity of the inverse emulsion. The same holds true for high temperature causing evaporation and subsequent condensation of water.

It is known in the art to remove the water completely or at least partially from such inverse emulsions thus obtaining a dispersion of particles of water-soluble polyacrylamide (co)polymers in a hydrophobic oil phase. Such dispersions are also known as "Liquid Dispersion Polymers", also abbreviated as LDP and—in contrast to inverse emulsions of polyacrylamide (co)polymers-usually their water contents is not more than 5 wt. %. The polymer contents of LDP may be up to more than 50 wt. %.

Liquid dispersion polymers and their manufacture are disclosed for example in DE 24 19 764 A1, U.S. Pat. No. 4,052,353, U.S. Pat. No. 4,528,321, U.S. Pat. No. 6,365,656 B1, or U.S. Pat. No. 6,833,406 B1. The citations suggest using such LDP's for instance for cosmetic applications, however none of the citations suggests to use LDPs for enhanced oil recovery or enhanced oil recovery off-shore.

Claim 1 of WO 2012/061147 A1 discloses a rheology modifier comprising a terpolymer of acryl amide, 2-acrylamido-2-methyl-propanesulfonic acid and a $C_{12}$- to $C_{25}$-alkyl acrylate made through a dispersion polymerization process. The application furthermore suggests to use such terpolymers in an oilfield wellbore fluid, i.e. "any liquid that serves a useful function when it is placed in a well during the processes of well construction, well treatment or the repair of a well" (page 1, paragraph [0004]), however there is no suggestion to use the terpolymers for enhanced oil recovery or enhanced oil recovery off-shore. Fluids for enhanced oil recovery are not used during processes of well construction, well treatment or the repair of a well, but after such processes have been finished and the well is ready for production. While a fluid for enhanced oil recovery has to pass through a wellbore into the formation it is not intended to have any function there. Rather it is the aim of a fluid for enhanced oil recovery comprising a thickening polymer to penetrate from an injection wellbore into the oil bearing formation and to flow towards a production wellbore thereby pushing oil towards the production wellbore where the oil can be recovered. Furthermore, example 14 of WO 2012/061147 A1 (paragraphs [0217] to [0226]) compares the performance of the terpolymer made through a dispersion polymerization process with a respective terpolymer which is a liquid dispersion polymer (LDP). Interestingly, WO 2012/061147 A1 finds that the LDP are inferior as compared to terpolymers made through a dispersion polymerization process in its application tests.

US 2010/004830 A1 discloses a treatment fluid for high-temperature fracturing operations comprising an aqueous base fluid and a gelling agent comprising a terpolymer of acryl amide, 2-acrylamido-2-methyl-propanesulfonic acid and acrylic acid and furthermore a crosslinking agent selected from the group of zirconyl chloride and zirconium sulfate. According to example 1 the terpolymer may be a liquid dispersion polymer. The application does not mention enhanced oil recovery and furthermore crosslinked polymers are not suitable for enhanced oil recovery because they would plug the formation.

WO 02/44228 A2 discloses the use of a liquid dispersion polymer composition comprising particles of a water soluble or water swellable polymer in silicon oil. The polymer may comprise acryl amide. The application suggests to use such composition for cosmetic purposes and does not mention the use in oil field applications.

US 2005/0239957 A1 discloses a polymeric inverse emulsion and its use for paper making, flocculants or the manufacture of paints. The application does not teach the conversion of inverse emulsions to LDPs nor the use of LDPs for enhanced oil recovery.

It is an object of the present invention to provide an improved process for enhanced oil recovery in particular for use in off-shore oil production.

BRIEF SUMMARY OF THE INVENTION

Correspondingly, a process for mineral oil production has been found in which an aqueous injection fluid comprising at least a water soluble polyacrylamide-(co)polymer dissolved in the aqueous fluid is injected through at least one injection borehole into a mineral oil deposit, and crude oil is withdrawn from the deposit through at least one production borehole, wherein the process at least comprises the following steps:

(1) providing a liquid dispersion polymer composition at least comprising
   (A) 20% to 59.9% by weight of an organic, hydrophobic liquid having a boiling point >100° C.,
   (B) 40% to 79.9% by weight of particles of at least one water soluble polyacrylamide-(co)polymer having an average particle size of 0.4 µm to 5 µm dispersed in the organic liquid, wherein
      the water-soluble polyacrylamide-(co)polymer comprises 30% to 100% by weight of acrylamide units with respect to the total amount of all monomeric units in the (co)polymer, and
      has a weight average molecular weight $M_w$ of from 5,000,000 g/mole to 30,000,000 g/mole,
   (C) 0.1% to 10% by weight of at least two surfactants (C), wherein the surfactants (C) comprise
      0.05 to 5% by weight of at least one surfactant (C1) capable of stabilizing water-in-oil-emulsions, and
      0.05 to 5% by weight of at least one surfactant (C2) capable of stabilizing the dispersion,
   wherein the water contents of the liquid dispersion polymer composition is <10% by weight and wherein the proportions of each of the components of the liquid dispersion polymer composition is based on the total amount of all components thereof,
(2) adding at least one activating surfactant (D) to the liquid dispersion polymer composition,
(3) mixing the liquid dispersion polymer composition comprising at least one activating surfactant with an aqueous fluid, thus obtaining an aqueous injection fluid comprising at least one polyacrylamide-(co)polymer dissolved therein wherein the concentration of the polyacrylamide-(co)polymer in the injection fluid is from 0.05% by weight to 0.5% by weight based on the total amount of all components of the injection fluid, and
(4) injecting the aqueous injection fluid thus obtained into the mineral oil deposit.

DETAILED DESCRIPTION OF THE INVENTION

In a preferred embodiment of the invention step (1) comprises at least the following steps:
   (1-1) Providing an aqueous monomer solution comprising at least acryl amide and optionally further ethylenically unsaturated, water soluble comonomers,
   (1-2) emulsifying the aqueous monomer solution in an organic phase comprising at least an organic, hydrophobic liquid (A) using at least one surfactant (C1) as emulsifier,
   (1-3) adding at least one initiator for radical polymerization to the emulsion and polymerizing the monomers thus obtaining an inverse emulsion comprising an aqueous phase of polyacrylamide-(co)polymers dissolved or swollen in water wherein the aqueous phase is emulsified in the organic hydrophobic liquid (A), (1-4) adding at least one surfactant (C2), and (1-5) at least partially removing water from the emulsion thus yielding a liquid dispersion polymer composition having a water content of less than 10% by weight.

In a further preferred embodiment of the invention, at least the process steps (3) and (4) are carried out on an off-shore production site, in particular on off-shore platforms.

It goes without saying that is more complex and therefore more expensive to manufacture liquid dispersion polymer compositions as compared to the manufacture of inversion emulsions because the manufacturing procedure comprises an additional step of removing water.

However, due to its higher concentration the use of liquid dispersion polymer (LDP) compositions has the advantage to save costs for transport and storage. Furthermore, the stability is better and therefore storage and handling of liquid dispersion polymer compositions is easier.

Surprisingly and completely unexpected a mixture of liquid dispersion polymer compositions with sea water arrives faster at the final viscosity than a mixture of inverse emulsions and sea water. This is a big advantage on off-shore-platforms because due to missing storage tanks it is necessary to inject the diluted polymer solution into the formation as soon as possible after the mixing step.

With regard to the invention, the following should be stated specifically:

Step (1): Providing a Liquid Dispersion Polymer Composition

For carrying out the process according to the invention in course of step (1) a liquid dispersion polymer (LDP) composition comprising particles of water soluble polyacrylamide-(co)polymers (B) dispersed in an organic, hydrophobic liquid (A) is provided. Furthermore, the composition comprises at least two different surfactants (C). The water content of the liquid dispersion polymer composition is less than 10% by weight based on the total amount of all components of the dispersion, preferably less than 5% by weight and most preferably less than 3% by weight. It may be water free or at least substantially water free.

Organic, Hydrophobic Liquid (A)

The organic, hydrophobic liquid (A) has a boiling point of more than 100° C. Usually, the boiling point should be at least 135° C., preferably at least 180° C. and more preferably at least 200° C. If the organic liquid has a boiling range, the term "boiling point" refers to the lower limit of the boiling range. Of course also mixtures of two or more different organic, hydrophobic liquids may be used.

In one embodiment of the invention, the organic, hydrophobic liquids (A) are aliphatic and/or aromatic hydrocarbons, in particular aliphatic and/or aromatic hydrocarbon mixtures. Preferably, the hydrocarbon mixtures have a content of aromatic hydrocarbons of less than 5% by weight, more preferably less than 3%. In preferred embodiment of the invention the organic, hydrophobic liquids are hydrocarbon mixtures having a content of aromatic hydrocarbons of less than 3% by weight and a boiling point of at least 180° C. Such hydrocarbon mixtures are commercially available.

The amount of the organic, hydrophobic liquid (A) in the liquid dispersion polymer composition is from 20% to 59.9% by weight, preferably from 25 to 54% by weight and more preferably from 35% to 54% by weight based on the total amount of all components of the liquid dispersion polymer composition.

Particles of Water-Soluble Polyacrylamide-(Co)Polymers (B)

As component (B) the liquid dispersion polymer comprises particles of at least one water-soluble, preferably non-crosslinked polyacrylamide-(co)polymer which are dispersed in the organic, hydrophobic liquid. Of course, a mixture of two or more kinds of particles of water-soluble polyacrylamide-(co)polymers may be used.

Preferably, the polyacrylamide-(co)polymer should be miscible with water at all proportions, however it is the minimum requirement that the (co)polymer is soluble in water at a concentration of 2% by weight.

Usually, the polyacrylamide-(co)polymer is not crosslinked, although in special cases there may be a limited amount of crosslinking, provided however, that crosslinking does not affect the water solubility of the polyacrylamide-(co)polymer. Liquid dispersion polymer compositions comprising particles which only swell in water are not within the scope of the present invention.

The particles of the water-soluble polyacrylamide-(co) polymers have an average particle size of 0.4 µm to 5 µm, preferably 0.5 µm to 2 µm. Average particle size here means the d50 value of the particle size distribution (number average) which may be measured by the skilled artisan using known techniques for determining the particle size distribution.

The water-soluble polyacrylamide-(co)polymers comprise at least 30% by weight, preferably at least 50% by weight of acrylamide units with respect to the total amount of all monomeric units in the (co)polymer.

Optionally, the polyacrylamide-(co)polymers may comprise besides acryl amide at least one additional water soluble, ethylenically unsaturated, in particular monoethylenically unsaturated comonomer.

Preferably, such additional comonomers should be miscible with water in any ratio, but it is sufficient for execution of the invention that the monomers dissolve sufficiently in an aqueous phase to copolymerize with acryl amide. In general, the solubility of such additional monomers in water at room temperature should be at least 50 g/l, preferably at least 150 g/l and more preferably at least 250 g/l.

Besides an ethylenically unsaturated group, additional water soluble comonomers comprise one or more hydrophilic groups. The hydrophilic groups are in particular functional groups which comprise atoms selected from the group of O-, N-, S- or P-atoms.

Examples of suitable functional groups comprise carbonyl groups >C=O, ether groups —O—, in particular polyethylene oxide groups —($CH_2$—$CH_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —$SO_3$H, phosphonic acid groups —$PO_3H_2$ or phosphoric acid groups —OP(OH)$_3$.

Examples of suitable monoethylenically unsaturated comonomers comprising acid groups comprise monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids. Of course the monomers may be used as salts.

It is necessary to note that —COOH groups in polyacrylamide-copolymers may not only be obtained by copolymerizing acrylic amide and monomers comprising —COOH groups but also by hydrolyzing derivatives of —COOH groups after polymerization. For example, amide groups —CO—$NH_2$ of acryl amide may hydrolyze thus yielding —COOH groups.

Also to be mentioned are derivatives of acryl amide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Further examples comprise monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth)acrylates.

Suitable are also monomers having ammonium groups, i.e monomers having cationic groups, in particular ammonium derivatives of N-(ω-aminoalkyl)(meth)acrylamides or ω-aminoalkyl(meth)acrylic esters. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Further monoethylenically unsaturated monomers which may be used are monomers which may cause hydrophobic association of the (co)polymers. Such monomers comprise besides the ethylenic group and a hydrophilic part also a hydrophobic part. Such monomers are disclosed for instance in WO 2012/069477 A1.

If further water soluble, monoethylenically unsaturated comonomers are present besides acryl amide their amount may be from 0.1% to 70% by weight, preferably from 1% by weight to 50% by weight and more preferably from 10% by weight to 50% by weight based on the amount of all monomers.

In special cases, the polyacrylamide-(co)polymers may optionally comprise also a limited amount of crosslinking monomers, i.e. monomers comprising more than one polymerizable group, however, the amount of such monomers should usually not exceed 0.5% by weight, preferably 0.1% by weight based on the amount of all monomers. Preferably, no crosslinking monomers are used.

In a preferred embodiment of the invention, the polyacrylamide-(co)polymer comprises at least one monoethylenically unsaturated comonomer comprising acid groups. These are preferably monomers which comprise at least one group selected from the group of —COOH, —$SO_3H$ or —$PO_3H_2$, particular preference being given to monomers comprising COOH groups and/or —$SO_3H$ groups, where the acid groups may also be present completely or partially in the form of the corresponding salts. Preferably, at least one of the comonomers is a monomer selected from the group of acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups may be from 0.1 to 70% by weight, preferably from 1% by weight to 50% by weight and more preferably from 10% by weight to 50% by weight based on the amount of all monomers.

In a further preferred embodiment of the invention, the polyacrylamide-(co)polymer comprises from 50% to 90% by weight of acryl amide units and from 10% to 50% by weight of acrylic acid units and/or their respective salts, preferably from 60% to 80% by weight of acrylamide units and from 20% to 40% by weight of acrylic acid units.

In another preferred embodiment, the polyacrylamide-(co)polymer comprises at least one acid monomer, i.e. an anionic monomer and at least one cationic monomer. Acid monomers preferably comprise —COOH groups and/or —$SO_3H$ groups, where the acid groups may also be present completely or partially in the form of the corresponding salts. In particular suitable are cationic monomers comprising ammonium groups as mentioned above. In a preferred embodiment the polyacrylamide-(co)polymer comprises from 30% to 80% by weight of acryl amide units, from 10% to 35% by weight acid monomers and/or their respective salts, and from 10% to 35% by weight of cationic monomers.

The polyacrylamide-(co)polymers have a weight average molecular weight $M_w$ of from 5,000,000 g/mole to 30,000,000 g/mole, preferably from 10,000,000 g/mole to 25,000,000 g/mole, and for example 15,000,000 g/mole to 25,000,000 g/mole.

The amount of the particles of water-soluble polyacrylamide-(co)polymers in the liquid dispersion polymer composition is from 40% to 79.9% by weight, preferably from 40 to 60% by weight and more preferably from 45 to 55% by weight based on the total amount of all components of the liquid dispersion polymer composition.

Surfactants (C)

As component (C) the liquid dispersion polymer composition comprises at least two different surfactants (C1) and (C2). Of course also two or more surfactants (C1) and/or (C2) may be present and further surfactants may be present besides the surfactants (C1) and (C2).

The surfactants (C1) are surfactants capable of stabilizing water-in-oil-emulsions. They aim at obtaining an emulsion of the aqueous solution of monomers in the organic hydrophobic liquid (A) used for making the (co)polymer (B) (for details about the manufacture see below), however they may also have some effect on the stability of the dispersion of the particles of water-soluble polyacrylamide-(co)polymers in the organic hydrophobic liquid (A).

It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. Details and further references may be found for instance in "*Emulsions*" in *Kirk-Othmer, Encyclopedia of Chemical Technology, Online Edition*, John Wiley & Sons, Inc. 2012.

The surfactants (C1) usually have an HLB-value of not more than 9, preferably not more than 8, and more preferably from 3 to 8.

In order to obtain the abovementioned HLB values it is possible to use—in basically known manner-mixtures of different surfactants having different HLB values.

Examples of suitable surfactants (C1) comprise sorbitan esters, in particular sorbitan monoesters with $C_{12}$ to $C_{18}$-groups such as sorbitan monolaurate (HLB approx. 8.5), sorbitan monopalmitate (HLB approx. 7.5), sorbitan monostearate (HLB approx. 4.5), sorbitan monooleate (HLB approx. 4) but also sorbitan esters with more than one ester group such as sorbitan tristearate (HLB approx. 2), sorbitan trioleate (HLB approx. 2), ethoxylated fatty alcohols with 1 to 4 ethyleneoxy groups, e.g. polyoxyethylene (4) dodecylether ether (HLB value approx. 9), polyoxyethylene (2) hexadecyl ether (HLB value approx. 5) or polyoxyethylene (2) oleyl ether (HLB value approx. 4). A preferred surfactant (C1) is sorbitan monooleate.

The surfactants (C2) aim at stabilizing the dispersion of the particles of polyacrylamide-(co)polymers in the organic, hydrophobic phase (A) and optionally also at stabilizing the droplets of the aqueous monomer phase in the organic hydrophobic liquid (A) before and in course of the polymerization. The term "stabilizing" means in the usual manner that the surfactants (C2) prevent the dispersion from aggregation and flocculation.

The surfactants (C2) may be any surfactants which aim at such stabilization, however in a preferred embodiment the surfactants (C2) are oligomeric or polymeric surfactants. Due to the fact that oligomeric and polymeric surfactants have many anchor groups they absorb very strongly on the surface of the particles and furthermore oligomers/polymers are capable of forming a dense steric barrier on the surface of the particles which prevents aggregation. The number average molecular weight $M_n$ of such oligomeric or polymeric surfactants may for example range from 500 to 60,000 g/mol, preferably from 500 to 10,000 g/mol and more preferably from 1,000 to 5,000 g/mol.

Suitable oligomeric and/or polymeric surfactants for stabilizing polymer dispersions are known to the skilled artisan. Examples of such stabilizing polymers comprise amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic block copolymers comprise block copolymers comprising a hydrophobic block comprising alkylacrylates having longer alkyl chains, e.g. $C_6$ to $C_{22}$-alkyl chains, such as for instance hexyl(meth)acrylate, 2-ethylhexyl(meth)acrylate, octyl(meth)acrylate, dodecyl (meth)acrylate, hexadecyl(meth)acrylate or octadecyl(meth) acrylate. The hydrophilic block may comprise hydrophilic monomers such as acrylic acid, methacrylic acid or vinyl pyrrolidone.

Amphiphilic copolymers may comprise at least one hydrophobic monomer such alkylacrylates having longer alkyl chains, e.g. $C_6$ to $C_{22}$-alkyl chains as mentioned above or other long alkyl chains comprising monomers such as N-alkyl- or N-dialkyl acrylamides with $C_6$ to $C_{22}$-alkyl chains. As hydrophilic monomers the amphiphilic comonomers may comprise at least one monomer with acid groups such as for example acrylic acid, methacrylic acid, maleic acid or vinylsulfonic acid.

Further examples of amphiphilic copolymers comprise reaction products of poly-12-hydroxystearic acid, glycidylmethacrylate and (meth)acrylic acid such as disclosed in U.S. Pat. No. 6,365,656 B1, col. 7, line 58 to col. 8, line 48, copolymers of alkyl(meth)acrylates and amino functional monomers such as disclosed in U.S. Pat. No. 6,833,406 B1, col. 7, line 17 to line 50 or copolymers of alkylacrylates and/or N-alkyl- or N-dialkyl acrylamides and anionic and/or cationic monomers such as disclosed in U.S. Pat. No. 4,528,321, col. 5, lines 9 to 60.

Examples of comb polymers include polymers comprising a hydrophobic main chain, for example a polyester chain and hydrophilic side chains comprising ethyleneoxy groups.

The total amount of all surfactants (C) together in the liquid dispersion polymer composition is from 0.1% to 10% by weight, preferably from 0.2 to 10% by weight, more preferably 1 to 6% by weight in each case based on the total amount of all components of the liquid dispersion polymer composition.

The amount of all surfactants (C1) together in the liquid dispersion polymer composition is from 0.05% to 5% by weight, preferably from 0.1 to 5% by weight, more preferably 0.5 to 3% by weight in each case based on the total amount of all components of the liquid dispersion polymer composition.

The amount of all surfactants (C2) together in the liquid dispersion polymer composition is from 0.05% to 5% by weight, preferably from 0.1 to 5% by weight, more preferably 0.5 to 3% by weight in each case based on the total amount of all components of the liquid dispersion polymer composition.

Manufacture of the Liquid Dispersion Polymer Composition

The liquid dispersion polymer composition may preferably be synthesized according to the following procedure.

In a first step an inverse emulsion of polyacrylamide-(co) polymers is synthesized using procedures known to the skilled artisan. Such inverse emulsions are obtained by polymerizing an aqueous solution of acrylamide and optionally further water-soluble ethylenically unsaturated comonomers emulsified in a hydrophobic oil phase. In a following step water within such inverse emulsions is reduced to an amount of less than 10% by weight, preferably less than 5% by weight. Suitable techniques are described for instance in U.S. Pat. No. 4,052,353, U.S. Pat. No. 4,528,321, or DE 24 19 764 A1. An overview article has already been cited in the introduction of this application.

For the polymerization an aqueous monomer solution comprising acryl amide and optionally further ethylenically unsaturated comonomers is prepared. Acryl amide is a solid at room temperature and aqueous solutions comprising around 50% by weight of acryl amide are commercially available. If comonomers with acidic groups such as acrylic acid are used the acidic groups may be neutralized by adding aqueous bases such as aqueous sodium hydroxide. The concentration of all monomers together in the aqueous solution should usually be below 50% by weight based on the total of all components of the monomer solution, for example from 10% by weight to 50% by weight, preferably from 30% to 50% by weight and for example around 40% by weight.

The aqueous solution of acrylamide and optionally further comonomers is emulsified in the organic, hydrophobic liquid (A) using at least one surfactant (C1) as emulsifier. The surfactant (C1) may be added to the mixture or it may be added before to the monomer solution or preferably the organic, hydrophobic liquid (A). Of course besides the surfactant (C1) also other surfactants (C) may be used. It is also possible to add at least one stabilizing surfactant (C2) already at this stage.

In a preferred embodiment of the invention at least two different organic, hydrophobic liquids (A) having different boiling points (or boiling ranges) may be used. Preferably, one of the organic, hydrophobic liquids (A) may have a boiling point of at least 180° C. while the second one has a boiling point below 180° C., preferably below 150° C. Such lower boiling organic, hydrophobic liquids may support the removal of water during the second step. Emulsifying may be done in the usual manner, e.g. by stirring the mixture. The ratio of the aqueous phase (i.e. water+all monomers)/organic phase may be from 2:1 to 1:2, for example around 1:1.

After an emulsion has been formed polymerization may be initiated by adding oil- and/or water soluble initiators for radical polymerization to the emulsion. The initiators may be dissolved in water or water miscible organic solvents such as for instance alcohols. It may also be added as emulsion.

Examples of suitable polymerization initiators comprise organic peroxides such as tert-butyl hydroperoxide, sodium sulfite, sodium disulfite or organic sulfites, ammonium- or sodium peroxodisulfate, iron(II) salts or azo groups comprising initiators such as AIBN.

The polymerization temperature usually is from 50° C. to 100° C., preferably from 60° C. to 95° C. Heating may be done by external sources of heat and/or heat may be generated—in particular when starting polymerization—by the polymerization reaction itself. Polymerization times may for example be from 0.5 h to 10 h.

The polymerization yields an inverse emulsion comprising an aqueous phase of polyacrylamide-(co)polymers dissolved or swollen in water wherein the aqueous phase is emulsified in an organic phase comprising organic, hydrophobic liquids (A).

In order to convert the inverse emulsion obtained to the liquid dispersion polymer composition to be used in the process according to the invention, after the polymerization the water is distilled off from the emulsion thus yielding particles of polyacrylamide-(co)polymers emulsified in organic, hydrophobic liquids (A). If a surfactant (C2) had not yet been added to the dispersion, it is preferably added at the latest before the (partial) removal of water.

The water is at least removed to a level of less than 10% by weight, preferably less than 5% by weight and more preferably less than 3% by weight. In order to reach that goal the removal of water preferably is carried out at reduced pressure, e.g. at a pressure of 30 hPa to 500 hPa, preferably 50 hPa to 250 hPa. The temperature in course of water removal may typically be from 70° C. to 100° C. but also techniques which remove water at higher temperatures may be used. If the emulsion comprises additionally a low boiling organic liquid as mentioned above, advantageously water and the low boiling organic liquid may distill off together as mixture.

The manufacture of the liquid dispersion polymer composition used according to the present invention usually will take place in chemical production plants.

Step (2): Adding an Activating Surfactant (D)

In order to use the liquid dispersion polymer composition for enhanced oil recovery at least one activating surfactant (D) different from the surfactants (C) is added to the liquid dispersion polymer composition. Of course a mixture of two or more different surfactants (D) may be added. Furthermore, a mixture of two or more liquid dispersion polymer compositions may be used.

It is the aim of adding the activating surfactant to accelerate the formation of a (co)polymer solution after mixing the liquid dispersion polymer composition with an aqueous fluid.

Suitable surfactants (D) are preferably surfactants having an HLB-value of greater than 9, more preferably greater than 10 and most preferred from 10 to 18. Surfactants having such HLB-values are capable of stabilizing oil-in-water emulsions, so they aid in dispersing the organic, hydrophobic liquid (A) in the aqueous fluid added. Furthermore, they may improve the wettability of the polyacrylamide-(co) polymer particles.

Examples of suitable surfactants (D) comprise nonionic surfactants comprising a hydrocarbon group and a polyalkylenoxy group of sufficient hydrophilic nature. Preferably, nonionic surfactants of the general formula $R^1$—O—(CH($R^2$)—$CH_2$—O)$_n$H (I) may be used, wherein $R^1$ is a $C_8$ to $C_{22}$-hydrocarbon group, preferably an aliphatic $C_{10}$ to $C_{18}$-hydrocarbon group, n is a number of ≥4, preferably ≥6, and $R^2$ is H, methyl or ethyl with the proviso that at least 50% of the groups $R^2$ are H. Examples of such surfactants include poly ethoxylates based on $C_{10}$- to $C_{18}$-alcohols such as $C_{12/14}$-, $C_{14/18}$- or $C_{16/18}$-fatty alcohols, $C_{13}$- or $C_{13/15}$-oxoalcohols. The HLB-value may be adjusted in the usual manner by selecting the number of ethoxy groups. Specific examples include tridecylalcohol ethoxylates comprising from 4 to 14 ethylenoxy groups, e.g. tridecylalcohol*8 EO (HLB-value approx. 13-14) or $C_{12/14}$ fatty alcohol ethoxylates, e.g. $C_{12/14}$*8 EO (HLB-value approx. 13).

Further examples of suitable surfactants (D) comprise anionic surfactants, for example surfactants comprising phosphate or phosphonic acid groups.

The amount of all surfactants (D) in the liquid dispersion polymer composition is from 1% to 10% by weight, preferably from 1% to 5% by weight based on the total amount of all components of the liquid dispersion polymer composition.

Adding the activating surfactant(s) (D) may be done directly after preparation of the liquid dispersion polymer composition, i.e. the liquid dispersion polymer composition which is transported from the location of manufacture to the location of use already comprises at least one activating surfactant (D).

In another embodiment the activating surfactant(s) (D) may be added to the liquid dispersion polymer composition at the location of use, e.g. at an off-shore production site.

Optional further components may be added to the liquids dispersion polymer composition before or in course of step (3). Examples of such components comprise radical scavengers, oxygen scavengers, chelating agents, biocides or sacrificial agents.

Step (3): Mixing the Liquid Dispersion Polymer Composition with an Aqueous Fluid In course of step (3) the liquid dispersion polymer composition comprising at least one activating surfactant (D) is mixed with an aqueous fluid. In course of mixing the liquid dispersion polymer composition the polyacrylamide-(co) polymer particles dissolve in the aqueous fluid thus obtaining a diluted aqueous injection fluid comprising at least one polyacrylamide-(co)polymer dissolved therein.

The aqueous fluid used for dilution may be fresh water or water comprising salts. For example, it is possible to use sea water to make up the aqueous injection fluid, or it is possible to use produced formation water, which is reused in this manner. In the case of off-shore production in general sea water is used for dilution. Of course also a mixture of sea water or formation water with fresh water may be used.

The salts may especially be alkali metal salts and alkaline earth metal salts. Examples of typical cations comprise $Na^+$, $K^+$, $Mg^{2+}$ or $Ca^{2+}$, and examples of typical anions comprise chloride, bromide, hydrogen carbonate, sulfate or borate.

The total amount of all salts in the aqueous fluid used for dilution depends on the nature of aqueous fluid used for dilution. By the way of example it may be from 1,000 ppm to 350,000 ppm (parts by weight), based on the sum of all components of the aqueous fluid used for dilution. When sea water is used the salt content may be from 1,000 ppm to 50,000 ppm, e.g. from 8,000 to 50,000 ppm and, when formation water is used, generally 100,000 ppm to 250,000 ppm. The amount of alkaline earth metal ions may be 1,000 to 53,000 ppm.

The aqueous fluid may also comprise additional components or additives. Such additional components are known to the skilled artisan and he/she may make an appropriate selection. Examples of such components comprise radical scavengers, oxygen scavengers, chelating agents, biocides or sacrificial agents. For enhanced oil recovery operations no components which might cause crosslinking of polyacrylamide-(co)polymers should be used.

The amount of aqueous fluid used for mixing with the liquid dispersion polymer composition is selected in such a manner that the concentration of the polyacrylamide-(co)polymer in the injection fluid is from 0.05% to 0.5% by weight based on the total amount of all components of the injection fluid. The concentration is selected by the skilled artisan according to the desired viscosity of the aqueous injection fluid.

Mixing of the liquid dispersion polymer composition with the aqueous fluid may be performed continuously or discontinuously, preferably it is performed continuously.

Mixing may be performed using usual mixing equipment known to the skilled artisan. Examples of suitable mixing equipment include static mixers, inline mixers, choke valves, orifice plates or mechanical mixers such as triplex pumps.

The organic, hydrophobic liquid (A) remains in the aqueous injection fluid and is not separated. Considering the amount of aqueous fluid used for dilution the concentration of organic, hydrophobic liquid(s) in the aqueous injection fluid is significantly below 1% by weight.

In a preferred embodiment of the invention, mixing the liquid dispersion polymer composition with the aqueous fluid comprises a pre-dilution step. In said embodiment the liquid dispersion polymer composition is pre-diluted with the aqueous fluid in a first step (3-1) obtaining a concentrate and thereafter the concentrate is further diluted to the final concentration in at least one additional step (3-2) with additional aqueous fluid. Of course mixing may comprise more than two steps in which the concentration of the polymers is stepwise reduced. A 2-step-process comprising only the two steps (3-1) and (3-2) is preferred. Preferably, a 2-step process for mixing may be a continuous process.

In the pre-dilution step (3-1) the liquid dispersion polymer composition usually is diluted to a concentration of 0.51% to 5% by weight of the polyacrylamide-(co)polymer, preferably 0.51% to 2% by weight and for example to a concentration of 1 to 2% by weight.

In a preferred the second stage dilution (3-2) may be performed close to the first stage dilution (3-1) in order to save space which is in particular advantageous on offshore platforms. Said technique has the additional advantages that this second stage dilution can occur whilst the pre-diluted polymer has still not developed its maximum viscosity, and this makes further dilution easier and avoids some potential shear damage to fully dissolved polymer. This can also introduce cost savings as the second stage dilution equipment has to work less hard, and therefore can be of simpler design.

Preferably, the pre-dilution step (3-1) may be performed using a static mixer and also for the second step (3-2) preferably a static mixer may be used. For instance the installation disclosed in EP 2 283 915 A1 may be used for the process.

In a preferred embodiment of the invention, step (3) is performed on an off-shore production site.

Step (4): Injecting the Injection Fluid

To execute the process according to the invention, at least one production borehole and at least one injection borehole are sunk into the mineral oil deposit. In general, a mineral oil deposit is provided with several injection boreholes and with several production boreholes. The deposit temperature of the mineral oil deposit may be from 20 to 140° C., preferably from 30° C. to 100° C.

In step (4), the aqueous injection fluid obtained in course of step (3) is injected through at least one injection borehole into a mineral oil deposit and crude oil is withdrawn from the deposit through at least one production borehole. The term "mineral oil" in this context of course does not only mean single-phase oil, but the term also comprises the customary live crude oil-water emulsions. As a result of the pressure generated by the viscous aqueous injection fluid injected into the injection borehole, the mineral oil in the formation flows in the direction of the production borehole and finally is produced via the production borehole.

The viscosity of the aqueous injection fluid is adapted by the skilled artisan to the viscosity of the oil in the formation. The viscosity of the aqueous injection fluid may preferably be in about the same as that of the oil but it may also be less than that of the oil but more than that of water. Even if it is less, additional oil is mobilized from the mineral oil deposit as compared to water flooding, i.e. the use of water without polymer dissolved therein as a flood medium.

Optionally the aqueous injection fluid can be injected together with surfactants or alkali in the so-called surfactant-polymer (SP) or alkali-surfactant-polymer (ASP) processes. Moreover, it is possible to combine the injection of the aqueous injection fluid with the injection of gas (e.g. $CO_2$, $N_2$) or to alternately inject the aqueous injection fluid and gas.

In a preferred embodiment of the invention, steps (3) and (4) are both performed on an offshore production site.

The process of the present invention has a number of advantages compared to the use of inverse emulsions, in particular on off-shore production sites.

The higher concentration of polymers in the liquid dispersion polymer compositions reduces costs for storage and transport. Especially offshore, the stability of liquid dispersion polymer compositions is better and therefore storage and handling of liquid dispersion polymer compositions is easier.

On offshore platforms, the number of injection wells may be limited through costs and logistics and therefore it is important to run the process injecting a polymer solution efficiently. By using the process according to the present invention, in particular in combination with a continuous 2-step process for dilution the time from the first contact of the liquid dispersion polymer composition with the aqueous fluid for dilution until injection of the injection fluid may be less than 30 min.

A further advantage of the liquid dispersion polymer composition is the higher flexibility with regard to the activator surfactant(s) (D). The high water content of an inverse emulsion prevents the use of strong activating surfactants, because the presence of these strong activators could cause premature inversion of the emulsion. For the same reason, also the amount of activating surfactant (D) is limited. In the present invention also strong activating surfactants (D) and/or higher dosages of activating surfactants (D) may be added to the LDPs already after their manufacture without causing premature inversion which facilitates a fast generation of viscosity in the aqueous polymer solution. This is a big advantage on offshore-platforms because due to missing storage tanks it is necessary to inject the diluted polymer solution into the formation as soon as possible after the mixing step.

The examples which follow are intended to illustrate the invention in detail:

Starting Materials

Example 1: Liquid Dispersion Polymer

LDP of 64% by weight of acrylamide and 36% by weight of acrylic acid
Preparation of the Oil Phase:
10.3 g of the nonionic surfactant sorbitanmonooleat (Span® 80) as emulsifier (C1) were dissolved in 5.5 g of a hydrocarbon mixture free of aromatic compounds (boiling range: 210-280° C., Exxsol® D100). After dissolving the surfactant 164.5 g of hydrocarbon mixture free of aromatic compounds (boiling range: 145-200° C., Exxsol® D40) and 153.3 g of another hydrocarbon mixture free of aromatic compounds (boiling range: 369-471° C., Lukoil SN 150) were added. Finally, a solution of 8.1 g of an amphiphilic copolymer (comprising long chain (meth)acrylates and ethylenically unsaturated monomers comprising acid groups) dissolved in 32.1 g D40 were added (as surfactant (C2)).
Preparation of an Aqueous Monomer Phase:
67.2 g of an aqueous sodium hydroxide solution (50% by weight of NaOH) were added to 130.2 g of de-ionized water. Thereafter 62.6 g of acrylic acid were added while keeping the temperature between 0 and 25° C. Then 221.2 g of a solution of acrylamide in water (acrylamide contents 50% by weight) and 0.3 g of the complexing agent diethylenetriaminepentaacetic acid were added.
Polymerization:
The monomer phase and the oil phase were mixed and the aqueous monomer phase emulsified in the oil phase using a dissolver. The emulsion was placed into a three-necked flask equipped with a reflux condenser and a stirrer. Polymerization was started by adding 10.0 g of an aqueous solution of tert-butyl hydroperoxide (0.5% by weight of tert-butyl hydroperoxide) and 18.0 g of an aqueous solution of sodium bisulfite (0.5% by weight of sodium bisulfite) using suitable pumps. The rate of adding the two aqueous solutions was controlled in such a manner that temperature of the reaction mixture raised due to heat of reaction at a rate of about 1° C./min. After reaching a temperature maximum of about 60° C. 1.87 g of an AIBN solution (4% by weight AIBN in methanol) were added and the emulsion heated to 80° C. for one hour.

Thereafter, the reflux condenser was exchanged by a distillation apparatus and the water of the reaction mixture together with the low boiling hydrocarbons distilled off under vacuum (approximately 50 hPa-250 hPa).

After removal of the water a mixture of two activating surfactants (D) were added under stirring:
1.8 g of an alkylethoxylate: $C_{12/15}$ primary fatty alcohol alkoxylated with 6 propylene oxide and 6 ethylenoxide units
1.3 g of a phosphate surfactant: Ethoxy (5) tridecyl mono/di phosphate
Properties of the Emulsion:
Polymer contents: 52% by weight
Amount of water: 2.8% by weight
Amount of stabilizing surfactant (C): 2.2% by weight
$M_w$: app. 20,000,000 g/mole
Intrinsic viscosity: 18 dL/g
Average size of the particles: approx. 2 μm Example 2: Liquid Dispersion Polymer Commercially available liquid dispersion polymer of a partially hydrolyzed polyacrylamide, i.e. a copolymer comprising acrylamide units and acrylate units (salts of acrylic acid) (Alcomer® 120 UK). The amount of acrylate unit is 36% by weight.
Properties of the Emulsion:
Polymer contents: 50% by weight
Amount of water: 3% by weight
Amount of stabilizing surfactant (C): 2.3% by weight
$M_w$: 15,000,000 to 20,000,000 g/mole
Intrinsic viscosity: 18 dL/g
Average size of the particles: approx. 2 μm
The same activating surfactants as in example 1 were added in a total amount of 2.8%.

Comparative Example: Inverse Emulsion

Commercially available inverse emulsion of a partially hydrolyzed polyacrylamide, i.e. a copolymer comprising acrylamide units and acrylate units (salts of acrylic acid) (Alcomer® 123 LA). The amount of acrylate units is about 36% by weight.
Properties of the Emulsion:
Polymer contents: 31-33% by weight
Amount of water: 32-47% by weight
$M_w$: 15,000,000 to 20,000,000 g/mole
Intrinsic viscosity: 18 dL/g
Application Tests:
Synthetic Sea Water:
For the application test synthetic sea water was used. The following amounts of salts were intensively mixed and dried at a temperature of 60° C. to a constant weight:

| | |
|---|---|
| NaHCO$_3$ | 9.6 g |
| MgSO$_4$ * 7H$_2$O | 327.3 g |
| MgCl$_2$ * 6H$_2$O | 242.5 g |
| CaCl$_2$ * 6H$_2$O | 108.4 g |
| KCl | 37.7 g |
| NaCl | 1277.0 g |

35 g of the dried salt mixture thus obtained were dissolved in 1 l of distilled water.
Mixing of Polymers with Sea Water—Development of Viscosity:
The abovementioned Liquid dispersion polymer composition and—for comparative purposes—the inverse emulsion were mixed with the sea water mentioned above and the viscosity of the mixture was monitored as a function of time using a Brookfield LV viscosimeter equipped with UL adapter at a shear rate of 7.34 s$^{-1}$ and a temperature of 20° C.

For the viscosity measurements the inverse emulsion and the LDP composition each were mixed with sea water so that a mixture comprising 0.5% of the polymer was obtained and the viscosity of the mixtures was monitored a function of time.

Figure 1:
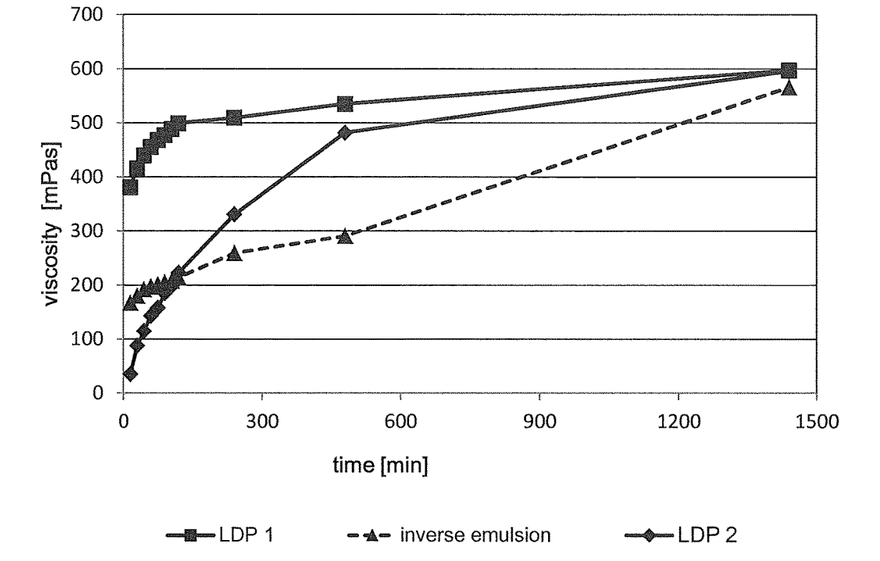
The FIGURE represents the effect on the viscosity of mixing the polymer with sea water.

The following table 1 summarizes the results and the FIGURE represents the results graphically.

TABLE 1

Results of the viscosity measurements

| time [min] | Example 1 LDP 1 viscosity [mPas] | Example 1 LDP 1 % of final viscosity | Example 2 LDP 2 viscosity [mPas] | Example 2 LDP 2 % of final viscosity | Comparative Example inverse emulsion viscosity [mPas] | Comparative Example inverse emulsion % of final viscosity |
|---|---|---|---|---|---|---|
| 15 | 381 | 64% | 35 | 6% | 167 | 30% |
| 30 | 416 | 70% | 88 | 15% | 180 | 32% |
| 45 | 440 | 74% | 115 | 19% | 192 | 34% |
| 60 | 455 | 76% | 143 | 24% | 197 | 35% |
| 75 | 468 | 78% | 158 | 27% | 201 | 36% |
| 90 | 477 | 80% | 185 | 31% | 205 | 36% |
| 105 | 488 | 82% | 198 | 33% | 208 | 37% |
| 120 | 499 | 84% | 223 | 37% | 214 | 38% |
| 240 | 509 | 85% | 331 | 56% | 259 | 46% |
| 480 | 535 | 90% | 482 | 81% | 291 | 51% |
| 1440 | 597 | 100% | 596 | 100% | 566 | 100% |

After 24 h all of the polymer samples yield a similar final viscosity, however the kinetics of arriving at such final viscosity is significantly different for the inverse emulsion as compared to the two LDP's. Although example 2 (LDP 2) starts with a significantly lower viscosity (only 6% of the final viscosity) than the comparative example, both in about have already the same viscosity after 2 h (37-38% of final viscosity), while example 1 already has 84% of the final viscosity. After 8 h the viscosity of the two LDP's already is 90% resp. 81% of the final value while the inverse emulsion only has 51% of the final viscosity. The LDP with the optimum activator package reaches the final viscosity far quicker than the inverse emulsion.

Test of Storage Stability

I) Storing Under Hot Climate Conditions

This storage stability test is intended to simulate the conditions of storing a container with a liquid polymer formulation on an off-shore platform in tropical regions, i.e. the liquid heats up during the day under the influence of sunlight and it cools during night.

The polymer formulations are heated in a beaker glass covered with a watch glass to 60° C. for 8 h using a water bath. Thereafter the temperature is hold at 20° C. for 16 h. Said cycle was repeated 5 times. After the 5$^{th}$ cycle the contents of the beaker glass was filtered through a metal sieve having 212 µm pores.

LDP 1

Using LDP 1 having a water content of 2.8% by weight nothing condensed on the lower surface of the watch glass. No residue remained on the filter.

Inverse Emulsion

Using the inverse emulsion having a water content of 32 to 47% by weight water condensed on the lower surface of the watch glass and dropped back into the inverse emulsion. Such repeated condensation and dropping back of the water caused a local increase of the water content of the inverse emulsion at the surface, i.e. the polymer began to swell and to dissolve in the water. A gel remained on the filter. The amount of the gel was about 5% of the original amount of inverse emulsion in the beaker glass.

II) Storing Under Cold Climate Conditions

This storage stability test is intended to simulate the conditions of storing a container with a liquid polymer formulation on an off-shore platform in cold regions, i.e. the liquid cools to temperatures below the freezing point over night and heats up to temperatures above the freezing point during the day.

The polymer formulations were cooled down from 20° C. to −14° C. and held at this temperature for 16 h. Then the polymer formulation was stored for 8 h at 20° C. Said cycle was repeated 6 times. After the 6$^{th}$ cycle the contents of the beaker glass was filtered through a metal sieve having 212 µm pores. Furthermore, a sample was diluted to a polymer contents 0.5% in water the viscosity of the polymer solution was measured.

LDP 1:

There were no changes in the appearance of LDP 1. No residue remained on the filter. Before the 1$^{st}$ cycle, the viscosity of the solution was 5700 mPas. After the 6$^{th}$ cycle the viscosity was 5900 mPas Inverse Emulsion:

Using the inverse emulsion small gel-like particles were observed on the filter. The viscosity dropped from 3400 mPas to 3200 mPas.

The experiments show that the inverse emulsion forms gels when storing under hot climate or under cold climate conditions. Such gels may block filters or pipes. In order to store inverse emulsions under hot climate or under cold climate conditions additional measures are necessary in order to avoid the formations of gels. Such measures are not necessary when using the LDPs.

The invention claimed is:

1. A process for mineral oil production, wherein an aqueous injection fluid comprising at least a water soluble polyacrylamide-(co)polymer dissolved in the aqueous fluid is injected through at least one injection borehole into a mineral oil deposit, wherein the process comprises the following steps:

(1) providing a liquid dispersion polymer composition comprising (A) 20% to 59.9% by weight of an organic, hydrophobic liquid having a boiling point greater than 100° C., (B) 40% to 79.9% by weight of particles of at least one water soluble polyacrylamide-(co)polymer having an average particle size of 0.4 mm to 5 mm dispersed in the organic liquid, wherein the water-soluble polyacrylamide-(co)polymer comprises 50% to 90% by weight of acrylamide units, and 10 to 50% by weight of acrylic acid units and/or salts of acrylic acid, with respect to the total amount of all monomeric units in the (co)polymer, and has a weight average molecular weight $M_w$ of from 5,000,000 g/mole to 30,000,000 g/mole, and (C) 0.1% to 10% by weight of at least two different surfactants (C), wherein the surfactants (C) comprise 0.05 to 5% by weight of at least one surfactant (C1), and 0.05 to 5% by weight of at least one surfactant (C2), wherein the proportions of each of the components of the liquid dispersion polymer composition is based on the total amount of all components thereof, and the liquid dispersion polymer composition prepared by a process comprising the following steps:

(1-1) providing an aqueous monomer solution comprising acrylamide monomer, acrylic acid monomer, and optionally further ethylenically unsaturated, water soluble comonomers, (1-2) emulsifying the aqueous monomer solution in the organic, hydrophobic liquid (A) in the presence of the at least one surfactant (C1) to form an oil-in-water emulsion, (1-3) adding at least one initiator for radical polymerization to the oil-in-water emulsion to polymerize the acrylamide monomer, the acrylic acid monomer, and optional water soluble monomers, to obtain an inverse emulsion comprising an aqueous phase of the copolymer of polyacrylamide, dissolved or swollen in water, wherein the aqueous phase is emulsified in the organic hydrophobic liquid (A), (1-4) adding the at least one surfactant (C2) to stabilize the inverse emulsion, and (1-5) partially removing water from the inverse emulsion to yield a liquid dispersion polymer composition having a water content of less than 10% by weight, (2) adding at least one activating surfactant (D) to the liquid dispersion polymer composition, (3) mixing the liquid dispersion polymer composition comprising one activating surfactant (D) with an aqueous fluid, thus obtaining an aqueous injection fluid comprising 0.05% by weight to 0.5% by weight of the dispersion polymer, based on the total amount of all components of the injection fluid, and (4) injecting the aqueous injection fluid into the mineral oil deposit through at least the one injection borehole and crude oil is withdrawn from the mineral oil deposit through at least one production borehole.

2. The process according to claim 1, wherein step (3) comprises a pre-dilution step wherein the liquid dispersion polymer composition is pre-diluted with the aqueous fluid in a first step (3-1) obtaining a concentrate and then the concentrate is further diluted to a final concentration in a step (3-2) with additional aqueous fluid.

3. The process according to claim 2, wherein step (3) is a continuous process.

4. The process according to claim 2, wherein step (3-1) is performed using a static mixer.

5. The process according to claim 2, wherein in step (3-1) the liquid dispersion polymer composition is diluted to a concentration of 0.51% to 2% by weight of the polyacrylamide-(co)polymer.

6. The process according to claim 1, wherein the aqueous liquid fluid for diluting the liquid dispersion polymer comprises salts.

7. The process according to claim 1, wherein the water contents of the liquid dispersion polymer composition is less than 5% by weight.

8. The process according to claim 1, wherein at least the process steps (3) and (4) are carried out on an off-shore production site.

9. The process according to claim 8, wherein the aqueous liquid fluid for diluting the liquid dispersion polymer comprises sea water.

10. The process according to claim 1, wherein the surfactant (C1) has an HLB-value of not more than 9.

11. The process according to claim 10, wherein the surfactant (C1) is at least one selected from the group of sorbitan monolaurate, sorbitan monopalmitate, sorbitan monostearate, and sorbitan monooleate.

12. The process according to claim 1, wherein the surfactant (C2) is an oligomeric or polymeric surfactant.

13. The process according to claim 12, wherein the surfactant (C2) is at least one selected from the group of amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

14. The process according to claim 1, wherein the activating surfactant (D) has an HLB-value of more than 9.

15. The process according to claim 14, wherein the activating surfactant (D) comprises at least one nonionic surfactant of the general formula $R^1$—O—(CH($R^2$)—CH$_2$—O)$_n$H (I), wherein $R^1$ is a $C_8$ to $C_{22}$-hydrocarbon group, n is a number of 4, and $R^2$ is H, methyl or ethyl with the proviso that at least 50% of the groups $R^2$ are H.

16. The process according to claim 1, wherein the water soluble polyacrylamide-(co)polymer besides acrylamide comprises at least one additional water soluble monoethylenically unsaturated comonomer.

17. The process according to claim 1, wherein the surfactant (C2) is an oligomeric or polymeric surfactant with number average molecular weight from 500 to 10,000 g/mol.

* * * * *